US012621536B2

(12) United States Patent
Woodworth et al.

(10) Patent No.: US 12,621,536 B2
(45) Date of Patent: May 5, 2026

(54) INTERFACE TO ALLOW DISPLAY OF IoT DEVICE MESSAGES ON A CENTRAL SCREEN

(71) Applicant: CenturyLink Intellectual Property LLC, Broomfield, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 317 days.

(21) Appl. No.: 18/329,947

(22) Filed: Jun. 6, 2023

(65) Prior Publication Data

US 2023/0403436 A1       Dec. 14, 2023

Related U.S. Application Data

(60) Provisional application No. 63/366,187, filed on Jun. 10, 2022.

(51) Int. Cl.
*H04N 21/488* (2011.01)
*G16Y 10/70* (2020.01)
*H04N 21/443* (2011.01)

(52) U.S. Cl.
CPC ......... *H04N 21/4882* (2013.01); *G16Y 10/70* (2020.01); *H04N 21/4432* (2013.01)

(58) Field of Classification Search
CPC . H04N 21/4882; H04N 21/4432; G16Y 10/70
See application file for complete search history.

(56) References Cited

U.S. PATENT DOCUMENTS

| | | | | |
|---|---|---|---|---|
| 10,051,068 B2 * | 8/2018 | Sharma | ................... | H04W 4/70 |
| 2011/0161984 A1 * | 6/2011 | Jha | ........................... | G06F 9/542 |
| | | | | 719/318 |
| 2015/0006296 A1 * | 1/2015 | Gupta | ................ | G06Q 30/0269 |
| | | | | 705/14.66 |
| 2015/0134761 A1 * | 5/2015 | Sharma | ................... | H04L 67/55 |
| | | | | 709/204 |
| 2015/0199610 A1 * | 7/2015 | Hershberg | ............ | H04W 4/029 |
| | | | | 706/46 |
| 2015/0201035 A1 * | 7/2015 | Profit | ..................... | H04L 67/62 |
| | | | | 709/213 |

(Continued)

*Primary Examiner* — James R Sheleheda

(57) ABSTRACT

The present disclosure describes a system and method that can be used to define a standardized interface through which Internet of Things (IoT) device notifications from one or more IoT devices can be received and served to one or more network-connected television device displays based on configuration information. For instance, an IoT device notification, such as an informational notification, warning, video stream, or other information output by one of various types of IoT devices may be served to and displayed as a Picture-in-Picture on the network-connected television device display. The configuration information may cause an IoT device notification to be displayed on one or more network-connected television device displays when availability of the network-connected television device display is known, when availability of the network-connected television device display in association with a particular user is known, or according to another determined delivery action.

17 Claims, 5 Drawing Sheets

(56)  References Cited

U.S. PATENT DOCUMENTS

| | | | |
|---|---|---|---|
| 2016/0198536 A1* | 7/2016 | Britt | H02J 7/00 |
| | | | 315/149 |
| 2016/0227278 A1* | 8/2016 | Bugajski | H04N 21/43615 |
| 2018/0373399 A1* | 12/2018 | Battula | G06Q 10/1093 |
| 2019/0138992 A1* | 5/2019 | Chaudhri | G06Q 10/10 |
| 2023/0115096 A1* | 4/2023 | Aher | H04L 67/55 |
| | | | 709/224 |
| 2023/0115319 A1* | 4/2023 | Aher | H04L 51/043 |
| | | | 709/238 |
| 2023/0116657 A1* | 4/2023 | Aher | H04L 67/025 |
| | | | 709/224 |
| 2023/0403436 A1* | 12/2023 | Woodworth | G16Y 10/70 |

* cited by examiner

610 — PROCESSING UNIT

620 — SYSTEM MEMORY

630 — OPERATING SYSTEM

640 — PROGRAM MODULES

112 — API

600 — COMPUTING DEVICE

660 — REMOVABLE STORAGE

670 — NON-REMOVABLE STORAGE

680 — COMMUNICATION SYSTEMS

690 — INPUT/OUTPUT DEVICES

OTHER COMPUTING DEVICES — 695

INTERFACE TO ALLOW DISPLAY OF IoT DEVICE MESSAGES ON A CENTRAL SCREEN

CROSS-REFERENCE TO RELATED APPLICATIONS

This application claims the benefit of U.S. Provisional Application No. 63/366,187 filed Jun. 10, 2022, entitled "Interface to Allow Display of IoT Device Messages on a Central Screen," which is incorporated herein by reference in its entirety.

BACKGROUND

Devices that form part of the Internet of Things ((IoT) devices) offer many various technological conveniences. As such, users oftentimes have multiple IoT devices of various types located throughout their premises. Such IoT devices may separately operate to notify users of special events and/or status changes.

It is with respect to this general technical environment that aspects of the present technology disclosed herein have been contemplated. Furthermore, although a general environment is discussed, it should be understood that the examples described herein should not be limited to the general environment identified herein.

SUMMARY

The present disclosure describes a system and method for serving IoT device notifications to a network-connected television device. For example, a standardized interface may be provided through which IoT device notifications from various types of IoT devices can be received and served to one or more network-connected television device displays based on configuration information.

Accordingly, the present application describes a method for serving notifications, comprising: receiving configuration information associated with delivering Internet of Things (IoT) device notifications to a network-connected television device; generating at least one rule, based on the configuration information, including a delivery action to perform for an incoming IoT device notification; receiving availability information associated with the network-connected television device; receiving an IoT device notification in association with an IoT device; evaluating the rule for determining the delivery action; and performing the delivery action to deliver the IoT device notification to the network-connected television device.

The present application further describes a system, comprising: at least one processor; and memory storing instructions that, when executed by the at least one processor, cause the system to: receive configuration information associated with delivering Internet of Things (IoT) device notifications to a network-connected television device; generate at least one rule, based on the configuration information, including a delivery action to perform for an incoming IoT device notification; receive availability information associated with the network-connected television device; receive an IoT device notification in association with a network-connected IoT device; evaluate the rule for determining the delivery action; and perform the delivery action to deliver the IoT device notification to the network-connected television device.

The present application further describes a computer-readable storage medium storing instructions that, when executed by a computer, cause the computer to: receive configuration information associated with delivering Internet of Things (IoT) device notifications to a network-connected television device; generate at least one rule, based on the configuration information, including a delivery action to perform for an incoming IoT device notification; receive availability information associated with the network-connected television device; receive an IoT device notification in association with a network-connected IoT device; evaluate the rule for determining the delivery action; and perform the delivery action to deliver the IoT device notification to the network-connected television device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
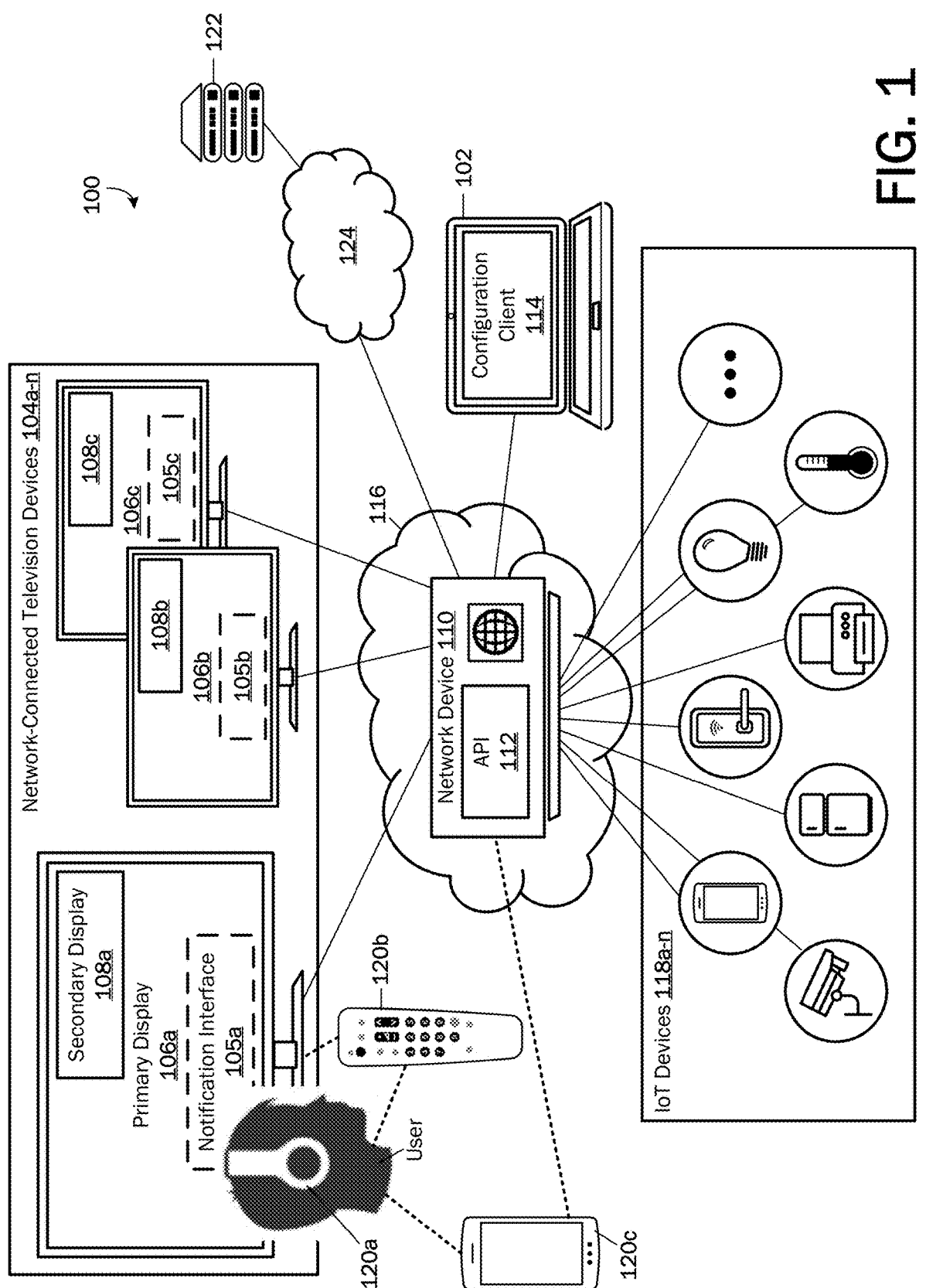
FIG. 1 is a block diagram of an example system for serving IoT device notifications to a network-connected television device in accordance with an example implementation.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, users oftentimes have multiple IoT devices of various types located throughout their premises, where such IoT devices may separately operate to notify users of special events and/or status changes sensed by the IoT devices. As used herein, an IoT device is a hardware device having a special-purpose computing system associated with it to allow the hardware device to communicate information collected by a physical sensor of the hardware device over a network. Additionally, millions of households have at least one network-connected television device, such as smart televisions, connected video game systems, Internet streaming devices, display devices that are not part of the IoT devices, etc. In examples used herein, a network-connected television device is a display device with a primary purpose of displaying video or images that are not received from, or associated with, an IoT device. Being able to receive and display notifications from various types of IoT devices on a network-connected television device when using the network-connected television device may be desired by a user. As such, the present disclosure describes a system and method that can be used to receive IoT device notifications on a network-connected television device display based on configuration information. For instance, an IoT device notification, such as an informational notification, warning, video stream, or other information output by an IoT device may be displayed as a Picture-in-Picture on the network-connected television device display.

In some examples, the configuration information may cause an IoT device notification to be displayed on one or more network-connected television device displays. In some examples, the configuration information may cause an IoT device notification to be displayed on a network-connected television device display when availability of the network-connected television device display is known. In some examples, the configuration information may cause an IoT device notification to be displayed on a network-connected television device display when availability of the network-connected television device display in association with a particular user is known. In some examples, the configuration information may cause a network-connected television device display to power on to display an IoT device notification. These and other aspects are explained in more detail below with respect to FIG. 1-FIG. 6.

With reference now to FIG. 1, an example system 100 for serving IoT device notifications to a network-connected television device is illustrated according to an example implementation. As shown, the system 100 includes a network device 110 communicatively connected to a plurality of IoT devices 118a-n (collectively, 118) and one or more network-connected television devices 104a-n (collectively, 104), such as smart televisions, connected video game systems, Internet streaming devices, or other display devices that are not part of the IoT devices 118. In some examples, the network device 110 provides a local network 116 and wired and wireless connectivity to the local network 116. In some examples, the network device 110 further provides connectivity to a Wide Area Network (WAN) 124 (e.g., the Internet). That is, the network device 110 may operate as a residential gateway device, such as a modem and router that connects one or more computing devices 102, IoT devices 118, etc., at a customer premises to a broadband network. In other examples, the network device 110 operates as a separate device connected to the local network 116. According to an aspect, the network device 110 may include various communication interfaces that enable the network device 110 to communicate with various IoT devices 118 using various communication methods.

The IoT devices 118 may include sensors, software, a circuit, or other technologies for collecting data (e.g., associated with a detected physical occurrence) and connecting and exchanging data with other systems. As described above, an IoT device 118 is a hardware device having a special-purpose computing system associated with it to allow the hardware device to communicate information collected by a physical sensor of the hardware device. Example IoT devices 118 may include, but are not limited to, security cameras, doorbells, appliances, thermostats, printers, locks, lighting systems, mobile devices, and the like. As a connected device, an IoT device 118 includes at least one communication component operative to transmit data via a wired or wireless communication method (e.g., WI-FI, BLUETOOTH, BLUETOOTH LOW ENERGY, ZIGBEE, LoRaWAN, Cellular, LTE, 5G, Ethernet). As an example, the IoT device 118 may pass messages over the network 124 to a cloud, edge, or other remote IoT service by routing the messages through the network device 110. The IoT service, for example, may execute on a server 122 and may turn received IoT data into useful information that may be offered to a user, stored for analysis, etc. An example of useful information includes an IoT device notification that offers information to a user about a particular event or status change sensed by an IoT device 118. As an example, an IoT device notification from a printer may be associated with a low level of ink, an IoT device notification from a refrigerator may be associated with a water filter that is due to be replaced, an IoT device notification from a security system or smart doorbell may indicate that someone is present and/or may include a video stream, etc.

The network-connected television devices 104, for example, may provide a primary display 106a-c (collectively, 106) for displaying media content (e.g., still and/or moving images, text, other visual material). As described above, the network-connected television devices 104 have a primary purpose of displaying video or images that are not received from, or associated with, an IoT device 118. For example, a network-connected television device 104 may display non-IoT video or images in the primary display 106.

The network-connected television devices 104 may further provide a secondary display 108a-c (collectively, 108), such as a picture-in-picture window or other area of a screen, that is displayed on top of or otherwise in addition to the primary display 106. For example, the secondary display 108 may allow a user to continue consuming media content displayed in the primary display 106 while also interacting with other content displayed in the secondary display 108.

According to an example implementation, content displayed in the secondary display 108 includes one or more IoT device notifications. For example and as shown schematically, the network-connected television devices 104 may include a notification interface 105a-c (collectively, 105) that operates to communicate with an Application Programming Interface (API) 112. As will be described in further detail below, the one or more IoT device notifications are provided to a network-connected television device 104 by the API 112, which includes instructions that, when executed by at least one processor, cause one or more of the aspects of the present disclosure described herein to be performed. In one example implementation, the API 112 is included in the network device 110. In another example implementation, the API 112 is implemented in a network-connected television device 104. In another example implementation, the API 112 is implemented in a computing device 102 in communication with the local network 116.

In some examples, the API 112 defines a standardized interface through which IoT device notifications from one or more IoT devices 118 can be received and served to one or more network-connected television devices 104 based on a set of configuration logic. According to an aspect, the API 112 is interoperable among the various IoT devices 118 and the one or more network-connected television devices 104 (e.g., via the notification interface 105). Thus, the API 112 can define standards by which IoT device notifications of various types can be presented in, e.g., the secondary display 108 of the one or more network-connected television devices 104. In some examples, the IoT devices 118 may pass messages, such as IoT device notifications, to the API 112 to be displayed on the network-connected television device 104. In other examples, the IoT device notifications are passed to the API 112 from a remote server, e.g., the cloud server 122, associated with the IoT device 118. According to an example implementation, and as will be described in further detail below, one or more IoT devices 118 and/or computing device 102 may further operate to receive notifications through the API 112, such as notifications of availability of a network-connected television device 104 on which an IoT device notification can be displayed to a user.

In some examples, configuration logic used by the API 112 to determine an action to perform (e.g., delivering a notification) is based on configuration information received from a configuration client 114. As illustrated, the configuration client 114 may execute on a computing device 102, such as a laptop computer, desktop computer, mobile device, gaming device, etc. In other examples, the configuration client 114 executes on a network-connected television device 104. The configuration client 114 may operate to receive configuration information in association with user input. For example, the configuration client 114 may provide a user interface (UI) via which the user can select or otherwise specify conditions, from options defined by the API 112, for delivering an IoT device notification to a network-connected television device 104.

In some examples, configuration logic used by the API 112 includes one or more rules with one or a combination of conditions for determining a delivery action for an incoming IoT device notification. The available conditions that may be combined to create such rules may be defined by the API 112. One example rule condition includes delivering an incoming IoT notification based on a type of the IoT device 118 from which the notification is received. For instance, a user may use the configuration client 114 to specify to deliver notifications received from an IoT device 118 embodied as a security system differently than notifications received from an IoT device 118 embodied as a lighting system.

Another example rule condition includes delivering an incoming IoT notification based on a type or severity level of the notification. As an example, the API 112 may permit an incoming IoT notification to be classified as informational, warning, error, critical, or another classification type. As another example, an incoming IoT notification may be classified as including image, audio, or video content. For instance, a user may use the configuration client 114 to specify to deliver error or critical notifications differently than informational notifications; and/or, the user may specify to deliver notifications including image, audio, or video content differently than notifications that do not.

Another example rule condition that may be defined by API 112 includes delivering an incoming IoT notification based on a time factor (e.g., time of day, day of the week). As an example, a user may use the configuration client 114 to specify to deliver notifications (e.g., all notifications or notifications meeting defined conditions) during certain time periods of the day or only on specified days of the week.

Another example rule condition that may be defined by API 112 includes delivering an incoming IoT notification based on availability of a network-connected television device 104. For instance, a user may use the configuration client 114 to specify to deliver notifications to a network-connected television device 104 when availability information associated with the network-connected television device 104 indicates that the television device is available. In some examples, the availability information (e.g., indication of availability) is provided by the network-connected television device 104 or a periphery device 120a-c (collectively, 120) in communication with the television device and/or in communication with the network device 110. The periphery device 120 may include various types of devices that can sense a proximity of the user in relation to the network-connected television device 104, activity of the user in relation to the network-connected television device 104, or other user-associated availability information. For instance, the availability information may include an indication that the network-connected television device 104 is powered on, is in communication with the network device 110, that a remote control (e.g., periphery device 120) of the television device is in motion (e.g., based on accelerometer data from the periphery device 120), or another indication of use of the network-connected television device 104. The indication of use of the network-connected television device 104, for example, may indicate that the network-connected television device 104 is available as a display device for displaying one or more IoT device notifications.

Another example rule condition includes delivering an incoming IoT notification based on a user, where a user may use the configuration client 114 to specify to deliver notifications to a network-connected television device 104 when availability information indicates that the network-connected television device 104 is being used by a particular user. For instance, an IoT device notification may be more relevant to one user (e.g., an adult user) in contrast to another user (e.g., a child user). In some examples, the user's identity is determined based on login information (e.g., selected or input by the user) in association with using an application (e.g., video/audio streaming service, video game) executing on the network-connected television device 104. In other examples, the user's identity is determined based on use of a periphery device 120 (e.g., BLUETOOTH headphones, mobile device, gaming device, etc., associated with the user) that is communicatively connected to the network-connected television device 104 or the network device 110.

Another example rule condition includes delivering an incoming IoT notification based on the network-connected television device 104, where a user may use the configuration client 114 to specify to deliver notifications to a particular network-connected television device 104. For instance, the user may select the particular network-connected television device 104 as a primary display for receiving IoT device notifications and may not wish to receive IoT device notifications on another network-connected television device 104.

Another example rule condition includes delivering an incoming IoT notification based on an application executing on (or not executing on) the network-connected television device 104. For instance, a user may use the configuration client 114 to specify to deliver notifications to a network-connected television device 104 only when a particular application (e.g., video/audio streaming service application, video game application) is running on the television device 104. As another example, the user may select for IoT device notifications not to be delivered while the application is running on the television device 104, e.g., if the user does not want to be disturbed during certain activities involving the television device 104. In some examples, the configuration client 114 is used to specify to deliver notifications to a network-connected television device 104 based on the severity/importance of the notification (e.g., a safety-related notification such as an alarm should be delivered in all instances, where a less important message may not be). As should be appreciated, other example rule conditions that may be defined by API 112 are possible and are within the scope of the present disclosure. Additionally, in some examples, a combination of the rule conditions may be used by the API 112 to determine a delivery action for an incoming IoT device notification. For example, the configuration client 114 may be used to specify (e.g., through Boolean operators) a combination of rule conditions made available by the API 112 in order to define a particular delivery action for an incoming IoT device notification.

In some examples, delivery actions are included in the configuration information received from the configuration client 114. For instance, a user may select or otherwise input certain delivery actions in relation to one or a combination of rule conditions. Example delivery actions include delivering an IoT device notification to any available network-connected television device 104 or to a particular network-connected television device 104, causing a network-connected television device 104 to power on to deliver a notification, delivering a specific number of notifications, escalating an intensity (e.g., frequency, volume, size) of a notification, allowing a notification to be dismissed, shared, snoozed, etc., or delivering a notification according to other delivery options.

In some examples, and as mentioned above, one or more of the IoT devices 118 are operative or configured to receive a notification or another type of indication of the availability of a network-connected television device 104. The notification/indication of availability may be provided to the IoT device(s) 118 by the API 112. For example, the IoT device(s) 118 may subscribe to receive notifications/indications of availability when a network-connected television device 104 is available to receive and display an IoT device notification to a user. The IoT device(s) 118 may, after receiving notification of an available network-connected television device 104, publish IoT device notifications to the API 112 to be delivered to the available network-connected television device 104.

Figure 2:
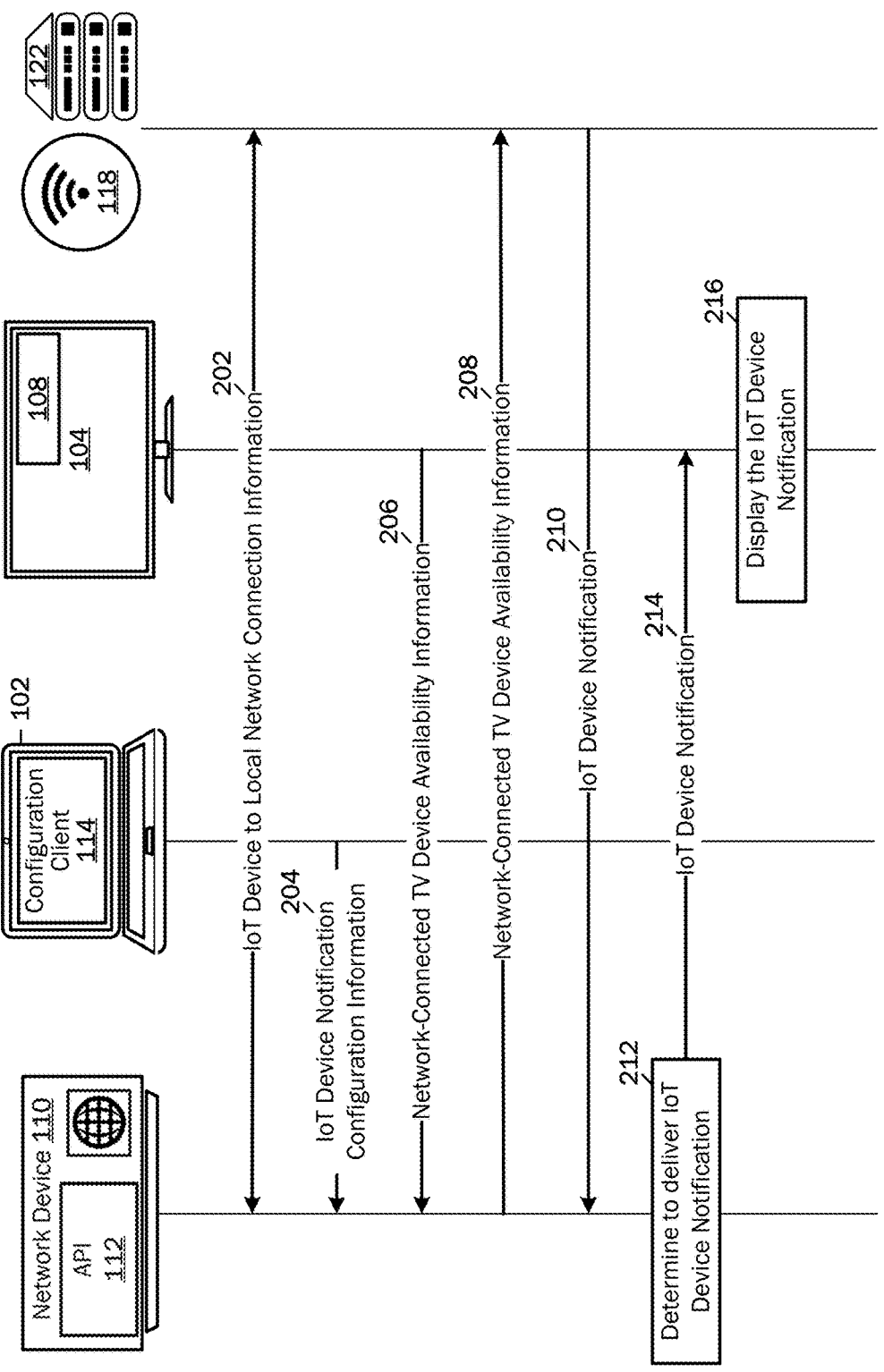
FIG. 2 is an example data flow diagram for serving IoT device notifications to a network-connected television device in accordance with an example implementation.

FIG. 2 illustrates a data flow diagram for serving IoT device notifications to a network-connected television device 104 in accordance with various example embodiments. For example, FIG. 2 illustrates various communications between the API 112 and the configuration client 114, a network-connected television device 104, and an IoT device 118 or an IoT service associated with the IoT device 118 that may execute remotely on a local or remote server 122. Communication 202 represents various messages that may be exchanged between the IoT device 118 and the network device 110 as part of connecting the IoT device 118 to the local network 116. As mentioned above, the IoT device 118 and the network device 110 may communicate via a variety of communication mechanisms (e.g., WI-FI, BLUETOOTH, BLUETOOTH LOW ENERGY, ZIGBEE, LoRaWAN, Cellular, LTE, 5G, Ethernet).

Communication 204 represents configuration information associated with delivery of notifications associated with the IoT device 118. For example, the configuration client 114 may receive the configuration information from a user and provide the configuration information to the API 112. The configuration information may include a selection of conditions that are configured into rules used by the API 112 to determine a delivery action for an incoming IoT device notification. In some examples, the configuration information is specific to the IoT device 118. In other examples, the configuration information is in association with IoT device notifications received from any connected IoT device 118 or to a particular type of IoT device 118. Example and non-limiting rule conditions include: delivering an incoming IoT notification based on a type of the IoT device 118 from which the notification is received; a type or severity level of the notification; a time factor; availability of a network-connected television device 104; use of a network-connected television device 104 by a specific user; use of a particular network-connected television device 104, use of a particular application on a network-connected television device 104, etc. Boolean or other operators may be used through the configuration client to combine rule conditions to define a delivery action.

Communication 206 represents availability information associated with a network-connected television device 104. Although illustrated as a single communication, in some examples, availability information may be transmitted to the API 112 periodically, in response to an availability status change, or in response to a request for availability information. In some examples, at least a portion of received availability information is received from a network-connected television device 104 or a periphery device 120 associated with the network-connected television device 104. In some examples, the availability information includes an indication of the network-connected television device 104 that is available (e.g., powered on). In some examples, the availability information includes an indication of a user of the network-connected television device 104, or an activity or activity level of such user. In some examples, the availability information includes an indication of an application running on the network-connected television device 104. In some examples, the availability information includes a time stamp. In some examples, at least a portion of received availability information is received from the network device 110 in association with network traffic of the network-connected television device 104.

Communication 208 may be included in some example implementations, where communication 208 represents a notification/indication of availability transmitted by the API 112 to the IoT device 118 (or an IoT associated with the IoT device) in response to receiving the availability information (communication 206) associated with the network-connected television device 104. For example, the notification/indication of availability may indicate to the IoT device 118 (or an IoT associated with the IoT device) that a network-connected television device 104 is available to receive and display an IoT device notification to a user. In other example implementations, communication 208 may not be sent.

Communication 210 represents an IoT device notification transmitted by the IoT device 118 (or an IoT associated with the IoT device) to the API 112, where the notification offers information about an event or status change sensed by the IoT device 118.

Operation 212 represents an evaluation of conditions associated with the received IoT device notification based on configuration logic. For example, the API 112 may determine a delivery action for the received IoT device notification when the condition(s) associated with the received IoT device notification match the condition or combination of conditions of a rule based on the configuration information provided by the configuration client 114.

Communication 214 represents the IoT device notification transmitted by the API 112 to the network-connected television device 104 for display to a user. For example, the IoT device notification is transmitted based on the determined delivery action. In some examples, the IoT device notification is transmitted to the network-connected television device 104. In some examples, the notification is transmitted to the network-connected television device 104 and another available network-connected television device. In some examples, the notification is transmitted to the network-connected television device 104 upon receiving the notification from the IoT device 118 (or IoT service associated with the IoT device). In other examples, the API 112 may delay sending the notification, and then transmit the notification to the network-connected television device 104 when a time, date, user, application, or other condition has been satisfied.

Operation 216 represents the IoT device notification displayed in a secondary display 108 associated with the network-connected television device 104. In some examples, a response to the IoT device notification may be received from the network-connected television device 104. The response, for example, may be a dismissal of the notification, a snooze of the notification, a request to forward the notification, etc.

Figure 3:
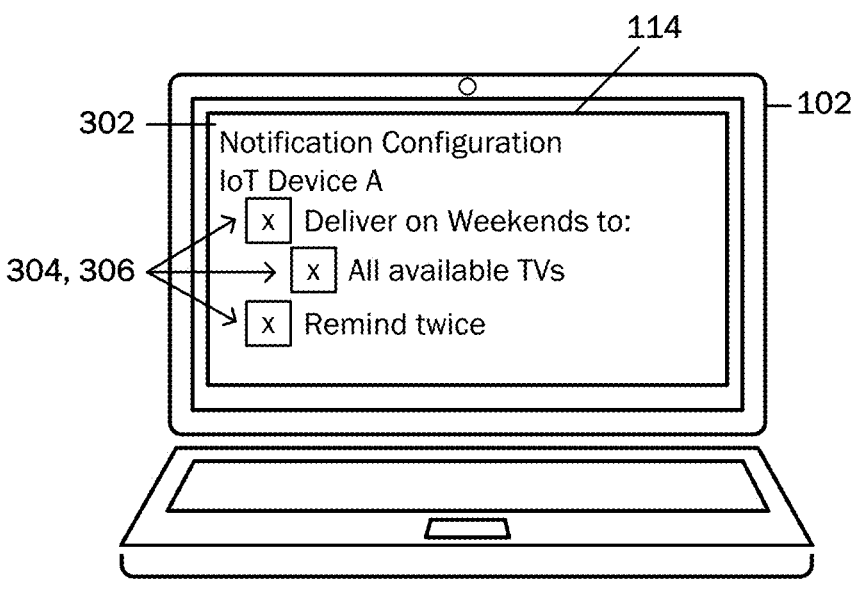
FIG. 3 is an illustration of an example user interface via which configuration information for delivering an IoT device notification may be received in accordance with an example implementation.

FIG. 3 is an illustration of an example UI 302 provided by the configuration client 114. For example, the configuration client 114 may execute on a computing device 102 and receive user selections of one or more conditions 304 and/or one or more delivery action options 306 associated with delivering an IoT device notification to a network-connected television device 104. As an example, the user selections of conditions 304 and/or delivery action options 306 may be in association with an IoT device 118 embodied as a smart refrigerator, and the selections may be sent to the API 112 by the configuration client 114.

Figure 4:
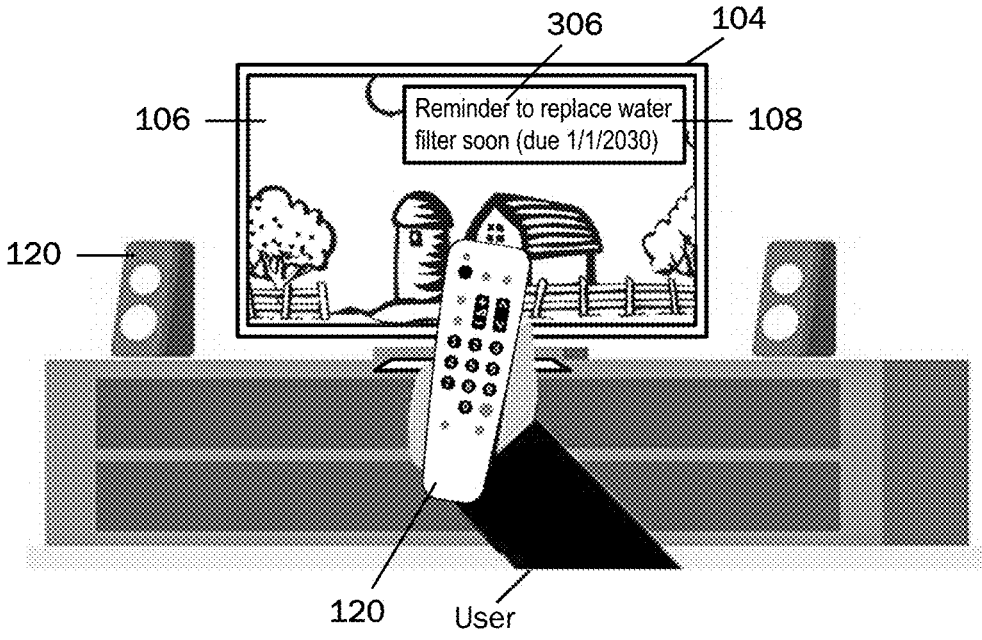
FIG. 4 is an illustration of an example IoT device notification displayed in a secondary display of a network-connected television device in accordance with an example implementation.

FIG. 4 is an illustration of an example scenario where a user is using a network-connected television device 104 to consume media content on the primary display 106 of the network-connected television device 104. Availability information associated with one or more of utilization of the network-connected television device 104, utilization of the television device by a specific user, utilization of a specific application, etc., may be received by the API 112. The API 112 may further receive an IoT device notification from the smart refrigerator (i.e., the IoT device 118 or IoT service associated with the IoT device) including information to provide to a/the user. The API 112 may determine that conditions for delivering the notification are met and may determine a delivery action to perform based on received configuration information. Accordingly, the API 112 may deliver the IoT device notification and, in some examples, provide instructions for presentation of the IoT device notification to the network-connected television device 104. For instance, the IoT device notification may include one or a combination of text, an image, a video, a link, etc., which may be displayed in the secondary display 108 of the network-connected television device 104, as shown in FIG. 4 based on the presentation instructions. According to one example implementation, the delivery action may cause the network device 110, on which the API 112 may operate, to power on the network-connected television device 104. For instance, availability information received from the network-connected television device 104, a periphery device 120 associated with the television device, or other network communication information that may be accessible to the network device 110 may indicate that the network-connected television device 104 may be powered off but that the user may be connected to the local network 116. Thus, the API 112 may instruct the network device 110 to turn on the network-connected television device 104 (e.g., via an HDMI cable connecting the television device to the network device). In some examples, powering on the network-connected television device 104 is performed only if one or more other rule conditions are met (e.g., the notification is classified as urgent). Other example delivery actions are possible and are within the scope of the present disclosure.

Figure 5:
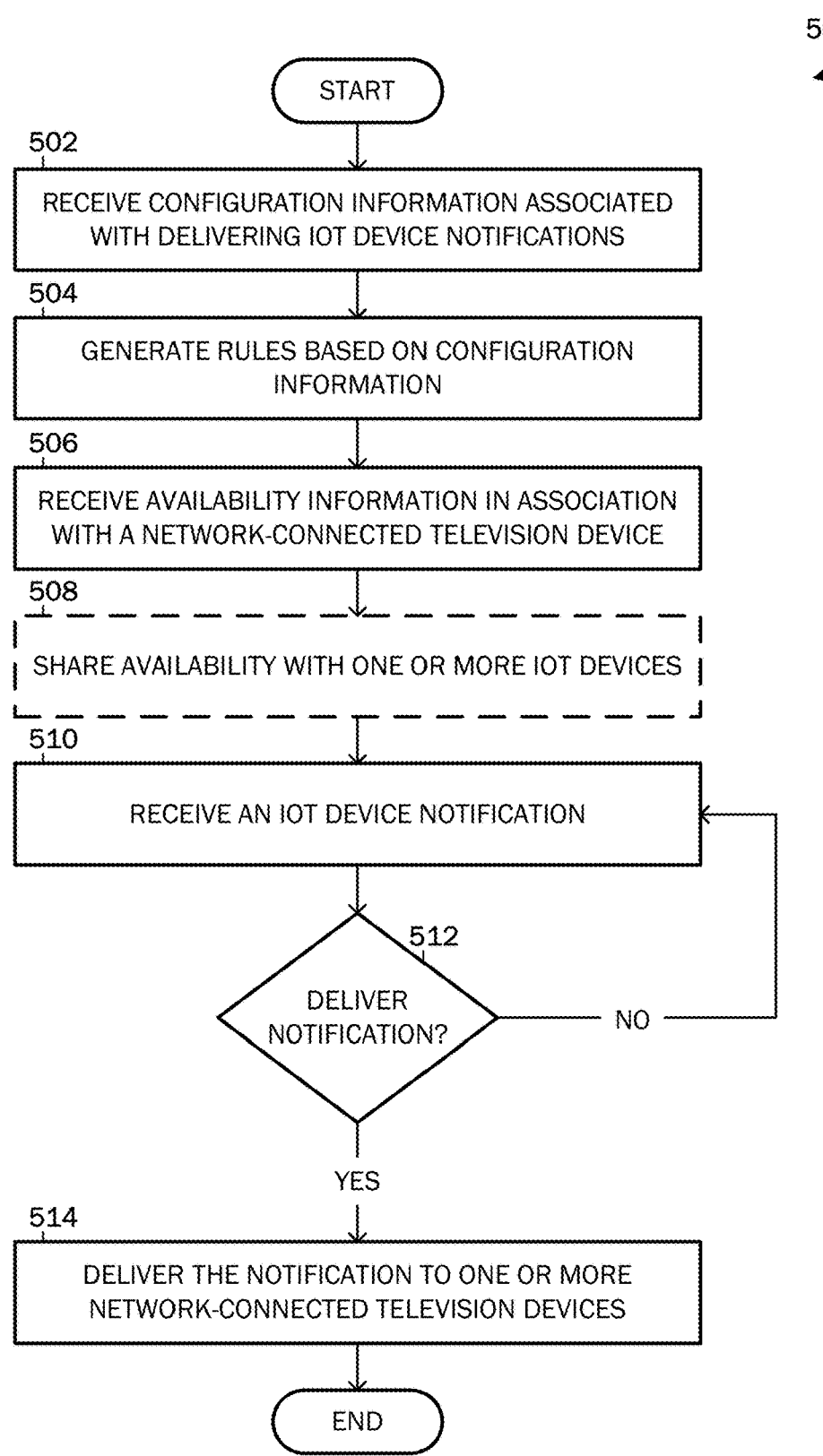
FIG. 5 is a flow chart of a method for serving IoT device notifications to a network-connected television device in accordance with an example implementation.

FIG. 5 is a flow diagram illustrating various example operations of a method 500 of serving IoT device notifications to a network-connected television device in accordance with an example implementation. For instance, the operations may be performed by the API 112 on a local network 116 to which one or more network-connected television devices 104 and one or more IoT devices 118 may be communicatively connected via a variety of wired or wireless communication mechanisms.

At operation 502, configuration information associated with delivering IoT device notifications is received. For example, configuration information associated with delivery of IoT device notifications may be received from a configuration client 114 based on one or more user selection.

At operation 504, one or more rules may be generated based on the configuration information. For instance, the one or more rules specify conditions and/or delivery actions associated with determining a delivery action for delivering an IoT device notification.

At operation 506, availability information associated with one or more network-connected television devices 104 is received. For example, the availability information may include an indication that the one or more network-connected television devices 104 are available (e.g., powered on), an indication of a user, an indication of an application, a time stamp, etc.

At optional operation 508, the availability information may be shared with one or more IoT devices (or IoT service(s) associated with the IoT device(s)). For example, the one or more IoT devices (or IoT service(s) associated with the IoT device(s)) may include logic that causes the device(s)/service(s) to send IoT device notifications upon receiving an indication of an available network-connected television device 104.

At operation 510, an IoT device notification may be received. For example, the notification may be associated with an event or status change sensed by an IoT device 118. In some examples, the IoT device notification may include metadata that allows the API 112 to classify the notification.

At decision operation 512, a determination may be made as to whether conditions associated with the received IoT device notification satisfy conditions of a rule for delivering the IoT device notification. When rule conditions are not satisfied, a determination may be made to not deliver the notification. In some examples, the method 500 may return to operation 510, where another IoT device notification is received. Alternatively, when a determination is made that conditions associated with the received IoT device notification satisfy conditions of a rule, a delivery action may be determined.

At operation 514, the delivery action determined at decision operation 512 is performed. For example, the IoT device notification may be transmitted to one or more network-connected television devices 104 for display to a user. In some examples, the IoT device notification is transmitted to any available network-connected television device 104. In other examples, the notification is transmitted to a specific network-connected television device 104. In other examples, the notification is transmitted at a specific time and/or date or within a specified time or date range, to a specified user, based on usage of a specified application, etc. The IoT device notification may then be displayed in a secondary display 108 associated with the network-connected television device 104. In some examples, a response to the IoT device notification may be received from the network-connected television device 104. The response, for example, may be a dismissal of the notification, a snooze of the notification, a request to forward the notification, etc.

Figure 6:
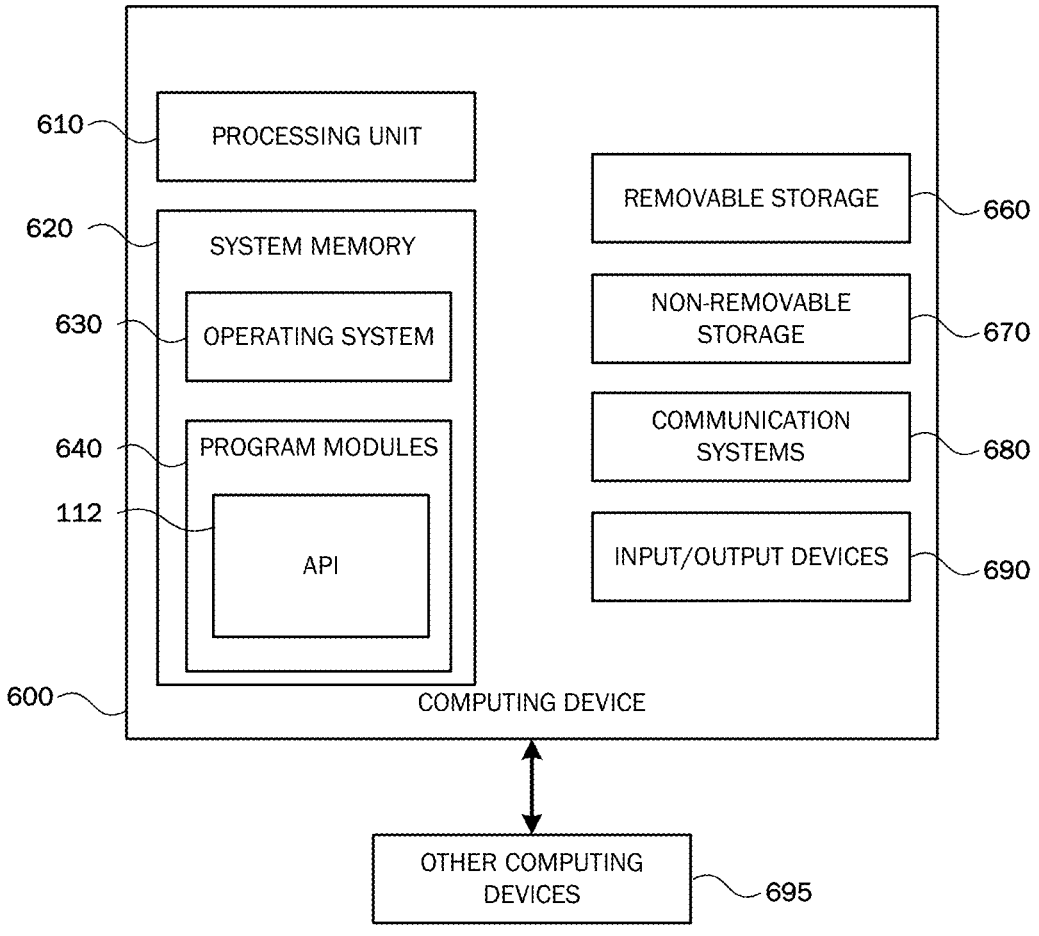
FIG. 6 is a block diagram of an example computing device with which one or more aspects of the disclosure may be implemented.

FIG. 6 is a system diagram of a computing device 600 according to an example. The computing device 600, or various components and systems of the computing device 600, may be integrated or associated with one or more of the devices or systems described above. As shown in FIG. 6, the physical components (e.g., hardware) of the computing device 600 are illustrated and these physical components may be used to practice the various aspects of the present disclosure.

The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that controls the operation of the computing device 600 and one or more program modules 640. A number of different program modules and data files may be stored in the system memory 620. While executing on the processing unit 610, the program modules 640 may perform the various processes described above. In one example, the program modules 640 include the API 112.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies.

The computing device 600 may include one or more communication systems 680 that enable the computing device 600 to communicate with other computing devices 695 such as, for example, routing engines, gateways, signings systems and the like. Examples of communication systems 680 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 600 may also have one or more input devices and/or one or more output devices shown as input/output devices 690. These input/output devices 690 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for serving notifications, comprising:
   receiving configuration information associated with delivering Internet of Things (IOT) device notifications to a network-connected television device;

generating at least one rule, based on the configuration information, including a delivery action to perform for an incoming IoT device notification;

receiving availability information associated with the network-connected television device;

receiving an IoT device notification in association with an IoT device;

evaluating the rule for determining the delivery action; and performing the delivery action to deliver the IoT device notification to the network-connected television device, wherein prior to receiving the IoT device notification, sharing the availability information with the IoT device.

2. The method of claim 1, wherein receiving the configuration information comprises receiving a user selection of at least one of:

one or more rule conditions; and one or more delivery actions.

3. The method of claim 2, wherein the one or more rule conditions include at least one of:

a type of IoT device from which the IOT device notification is received;

a type or severity level of the IoT device notification;

a time factor;

availability of the network-connected television device;

availability of the network-connected television device from amongst a plurality of network-connected television devices;

use of the network-connected television device by a user from amongst a plurality of users; and use of an application from amongst a plurality of applications on the network-connected television device.

4. The method of claim 2, wherein the one or more delivery actions include at least one of:

delivering the IoT device notification to the network-connected television device from amongst a plurality of network-connected television devices;

delivering the IoT device notification to the network-connected television device and other available network-connected television devices included in the plurality of network-connected television devices; and causing the network-connected television device to power on to deliver the IoT device notification.

5. The method of claim 1, wherein receiving availability information associated with the network-connected television device comprises receiving at least one of:

an indication the network-connected television device is powered on;

an indication of a user of the network-connected television device;

an indication of an application running on the network-connected television device;

a time stamp; and an indication a user is within a proximity of the network-connected television device.

6. The method of claim 1, wherein delivering the IoT device notification to the network-connected television device includes presentation instructions to display the IoT device notification in a secondary display of the network-connected television device.

7. A system, comprising:

at least one processor; and memory storing instructions that, when executed by the at least one processor, cause the system to:

receive configuration information associated with delivering Internet of Things (IoT) device notifications to a network-connected television device;

generate at least one rule, based on the configuration information, including a delivery action to perform for an incoming IoT device notification;

receive availability information associated with the network-connected television device;

receive an IoT device notification in association with a network-connected IoT device;

evaluate the rule for determining the delivery action; and perform the delivery action to deliver the IoT device notification to the network-connected television device, wherein prior to receiving the IoT device notification, the instructions further cause the system to share the availability information with the IoT device.

8. The system of claim 7, wherein the configuration information includes a user selection of at least one of:

one or more rule conditions; and one or more delivery actions.

9. The system of claim 8, wherein the one or more rule conditions include at least one of:

a type of IoT device from which the IoT device notification is received;

a type or severity level of the IoT device notification;

a time factor;

availability of the network-connected television device;

availability of the network-connected television device from amongst a plurality of network-connected television devices;

use of the network-connected television device by a user from amongst a plurality of users; and use of an application from amongst a plurality of applications on the network-connected television device.

10. The system of claim 8, wherein the one or more delivery actions include at least one of:

delivery of the IoT device notification to the network-connected television device from amongst a plurality of network-connected television devices;

delivery of the IoT device notification to the network-connected television device and other available network-connected television devices included in the plurality of network-connected television devices; and cause the network-connected television device to power on to deliver the IoT device notification.

11. The system of claim 7, wherein the availability information associated with the network-connected television device comprises includes at least one of:

an indication the network-connected television device is powered on;

an indication of a user of the network-connected television device;

an indication of an application running on the network-connected television device;

a time stamp; and an indication a user is within a proximity of the network-connected television device.

12. The system of claim 7, wherein the instructions further cause the system to cause the IoT device notification to be displayed in a secondary display of the network-connected television device.

13. The system of claim 7, wherein the IoT device notification includes at least one of:

text;

an image;

a video; and a link.

14. A computer-readable storage medium storing instructions that, when executed by a computer, cause the computer to:

receive configuration information associated with delivering Internet of Things (IOT) device notifications to a network-connected television device;

generate at least one rule, based on the configuration information, including a delivery action to perform for an incoming IoT device notification;

receive availability information associated with the network-connected television device;

receive an IoT device notification in association with a network-connected IoT device;

evaluate the rule for determining the delivery action; and perform the delivery action to deliver the IoT device notification to the network-connected television device, wherein, prior to the receiving of the IoT device notification, the instructions further cause the computer to share the availability information with the IoT device.

15. The computer-readable storage medium of claim 14, wherein the configuration information includes at least one of:

one or more rule conditions including at least one of:

a type of IoT device from which the IoT device notification is received;

a type or severity level of the IoT device notification;

a time factor;

availability of the network-connected television device;

availability of the network-connected television device from amongst a plurality of network-connected television devices;

use of the network-connected television device by a user from amongst a plurality of users; and use of an application from amongst a plurality of applications on the network-connected television device; and one or more delivery actions including at least one of:

delivery of the IoT device notification to the network-connected television device from amongst a plurality of network-connected television devices;

delivery of the IoT device notification to the network-connected television device and other available network-connected television devices included in the plurality of network-connected television devices; and cause the network-connected television device to power on to deliver the IoT device notification.

16. The computer-readable storage medium of claim 14, wherein the availability information associated with the network-connected television device includes at least one of:

an indication the network-connected television device is powered on;

an indication of a user of the network-connected television device;

an indication of an application running on the network-connected television device;

a time stamp; and an indication a user is within a proximity of the network-connected television device.

17. The computer-readable storage medium of claim 14, wherein the instructions further cause the computer to cause the IoT device notification to be displayed in a secondary display of the network-connected television device.

* * * * *